United States Patent Office 3,629,395
Patented Dec. 21, 1971

3,629,395
PHOSPHORUS-CONTAINING ANTI-CARIES
CHEWING GUM COMPOSITIONS
John H. Litchfield, Worthington, and Victor G. Vely,
Columbus, Ohio, assignors to Wm. Wrigley Jr. Company, Chicago, Ill.
No Drawing. Filed Sept. 5, 1969, Ser. No. 855,764
Int. Cl. A61r 7/16
U.S. Cl. 424—48                                                                                                5 Claims

ABSTRACT OF THE DISCLOSURE

Unique chewing gum compositions possessing anti-caries activity characteristics comprising a chewing gum base having incorporated therein a phosphate, a phosphorylated α-hydroxyaldehyde, or a phosphonic acid derivative. Specific phosphorous-containing compounds which, upon evaluation, exhibited the ability to inhibit the growth of oral microorganisms and/or the formation of acids in the oral cavity are: 1 hydroxyethyl phosphonic acid, 1,2-dihydroxyethylphosphonic acid, 1-amino-ethyl-phosphonic acid, 2-aminoethylphosphonic acid, 1-aminomethylphosphonic acid, 2-amino, 4-phosphonobutyric acid, 2-amino, 3-phosphonopropionic acid, glyceraldehyde-3-phosphoric acid and glyceraldehyde diphosphate.

---

The present invention contemplates novel and unique chewing gum compositions possessing anti-caries activity which, upon chewing, have the ability to inhibit the growth of oral microorganisms and the formation of acids in the oral cavity thereby providing protection for extended periods even after the gum composition has been chewed or masticated and discarded.

Heretofore, it has been generally known and accepted that the elaboration of acid through the breakdown of readily fermentable carbohydrates, by the action of acidogenic oral bacteria, is a primary cause of dental caries. The method or mechanism of dental caries is generally characterized by a decalcification of the inorganic portion of the tooth and is accompanied by or followed by a disintegration of the organic matrix. The acids are formed on the tooth surface, and, if they are not neutralized or otherwise destroyed, the demineralization of the tooth will proceed.

Dentrifices and similar preparations applied to the tooth surfaces and gums have been one means heretofore customarily employed in the cleaning of teeth; and, in addition, certain proposals have been advanced relative to development of medicated dentrifices having the ability to inhibit tooth decay and for the control of dental caries. Many of such medicated dentrifices contain various inhibiting agents, such as fluorides or amides.

Another means of control of dental caries involves the use of sodium fluoride by its addition to drinking water to provide a systemic effect, or by its topical application to tooth surfaces and has been accorded some degree of acceptance in this regard in the field. Still another means of control of dental caries involves the use of antibiotics such as penicillin and has produced some desirable results in control of dental caries; but this means is not without certain disadvantages involving sensitization of the patient, thereby limiting its value as a means of control of dental caries.

While numerous means have been heretofore proposed as potential candidates for inhibiting or neutralizing acid formation in the oral cavity as illustrated above, it appears that the problem of control of dental caries is much more complex and is not readily amenable to control by the application of conventional dentrifice preparations by the consumer once or twice a day. It appears that it is necessary for proper control of dental caries that any substance capable of inhibiting the growth of bacteria in the oral cavity should have a sufficiently prolonged effect such that after introduction into the oral cavity sufficient protection would be provided to inhibited the degradation process between periods of application, if not longer. Conventional dentrifices fail to provide such protection, and there is also the disadvantage with dentrifices that the materials are soon washed from the oral cavity, which lessens the time the active ingredients are in contact with the microorganisms.

It is apparent, therefore, that suitable means and compositions are lacking for combating the growth of oral microorganisms and acids during the periods between applications of the same to the oral cavity.

It is, accordingly, one object of the present invention to provide an anti-caries composition in the form of a chewing gum which eliminates many of the disadvantages normally associated with the use of conventional dentrifices customarily employed for the purpose of control of dental caries.

Another object of the invention resides in the provision of chewing gum compositions having anti-caries activity which are not only effective or inhibiting the formation or growth of microorganisms in the oral cavity but are also effective against the formation of the acids over extended periods of time. Thus, the chewing gum compositions provide protection not only while they are being masticated or chewed but even after they have been discarded.

Yet another object of the invention resides in the provision of chewing gum compositions including a phosphorus-containing compound of the group, 1-aminoethylphosphonic acid and glyceraldehyde-3-phosphoric acid which phosphorus-containing compounds are either readily releasable upon mastication in the oral cavity and are capable of inhibiting the formation of acids and/or inhibiting the growth of the microorganisms in the oral cavity for prolonged periods of time or through their direct contact with the teeth during mastication of the gum at the interface of the gum and the teeth are capable of inhibiting the growth of the microorganisms and the formation of acids in the oral cavity for prolonged periods of time.

These and other objects and advantages of the present invention will become further apparent from the teachings hereinafter provided by the detailed description, test data and examples.

In accordance with the above objects, it has been discovered that phosphorus compounds of the class described exhibit excellent inhibition of lactic acid formation (90 percent or greater) when tested in vitro by broth tube assay and reduce dental caries in simulated in vivo tests. These compounds (specifically, 1-aminoethylphosphonic acid and glyceraldehyde-3-phosphoric acid) are readily incorporated into chewing gum bases and through their release or interfacial contact with the teeth during mastication provide the level of activity desired for control of dental caries.

It has been found as shown in Table 1 that the incorporation of 1-aminoethylphosphonic acid and glyceraldehyde-3-phosphoric acid at concentrations of from about 0.1–5.0 weight percent in chewing gum compositions will inhibit the growth of oral microorganisms and the formation of acid in the oral cavity to a degree of 90 percent or greater.

In order to evaluate the phosphorus-containing compounds mentioned above for their effectiveness in control of dental caries many studies and both in vitro tests and simulated in vivo tests were carried out to confirm anti-caries activity. The results of these tests are summarized by the tabular data illustrated by Tables I and II which follow and which are discussed hereinafter in detail.

TABLE I.—CARIOSTATIC COMPOUNDS AND RELATED STRUCTURES; COMPARISON OF ACTIVITY AGAINST ORAL MICROORGANISMS IN VITRO

| Formula | | | Activity, acid production inhibition, percent [a] |
|---|---|---|---|
| Empirical | Structure | Name | |
| Compound: | | | |
| $C_2H_8O_3PN$ | $CH_3$—$CHNH_2PO(OH)_2$ | 1-aminoethylphosphonic acid | ++++ |
| $C_3H_7O_6P$ | $H_2O_3POCH_2CHOHCHO$ | Glyceraldehyde-3-phosphoric acid | ++++ |
| Compound: [b] | | | |
| $C_2H_8O_3PN$ | $CH_2NH_2CH_2PO(OH)_2$ | 2-aminoethylphosphonic acid | − |
| $C_1H_6O_3PN$ | $CH_2NH_2PO(OH)_2$ | 1-aminomethylphosphonic acid | + |
| $C_4H_{10}O_5PN$ | $CH_2COOHCH_2CHNH_2PO(OH)_2$ | 2-amino,4-phosphonobutyric acid | +− |

[a] Activity was measured by broth-tube assay to determine percent of acid-production inhibition obtained by *Lactobacillus casei* and *Streptococcus* sp. FA-1 in the presence of 0.1 percent of compound. Symbols designate the following degree of inhibition, percent:
-    0 to 9
- +−   10 to 24
- +    25 to 74
- ++   75 to 89
- +++   90 to 98
- ++++   99 to 100

[b] It is to be expected that in addition to the listed compounds 1-hydroxyethylphosphonic acid, 1,2-dihydroxyethylphosphonic acid, glyceraldehyde diphosphate, and 2-amino, 3-phosphonopropionic acid would behave similarly and would be effective acid-production inhibitors and anti-caries agents.

TABLE II.—EFFECT OF SALIVARY EXTRACTS OF CHEWING GUMS FORMULATED WITH 1-AMINOETHYLPHOSPHONIC ACID AND GLYCERALDEHYDE-3-PHOSPHORIC ACID ON MIXED ORAL MICROORGANISMS [a]

| Experimental chewing gum | | | | Chewing time, (min.) | Degree of inhibition [b] | |
|---|---|---|---|---|---|---|
| Agent | Percent | Base formulation | Extraction method | | Acid production | Growth |
| 1-aminoethylphosphonic acid | 1.0 | Gum base, spearmint flavor | Brabender | 60.0 | + | + |
| | | | Direct chew | 2.5 | + | +− |
| Glyceraldehyde-3-phosphoric acid | 1.0 | do | Brabender | 60.0 | +− | −(<75%) |

[a] Results reported are for a mixed oral inoculum in human saliva after a 24-hour incubation at 37° C. in the presence of chewing gum extract.

[b] Symbols designate the following degree of inhibition:
For acid production inhibition, percent:
- +−   10 to 24
- +    25 to 24

For growth inhibition, percent:
- −    0 to 75
- +−   75 to 89
- +    90 to 98

Note.—Assay flasks contained 50 percent saliva, a portion of which was derived from the Brabender salivary extract of the experimental chewing gum. Final carbohydrate (glucose/sucrose) concentration of the assay flask contents was 8 percent derived exclusively from chewing gum.

With respect to Table I, it can be seen that of the compounds evaluated only 1-aminoethylphosphonic acid and glyceraldehyde-3-phosphoric acid when tested in vitro in a 0.1 percent concentration by broth tube assay to determine percent of acid production inhibition obtained by *Lactobacillus casei* and *Streptococcus* sp. FA-1 showed 99 to 100 percent acid production inhibition. These compounds are therefore preferred as more efficient.

The simulated in vivo tests and their results are illustrated in Table II, appearing above, wherein the cariostatic potential of the formulations was studied by microbiological assay techniques and by chemical analysis. Extracts of the chewing gums were prepared by direct chewing by human subjects.

The anti-microbial activity of these extracts was determined by measuring simultaneously the effect of the extracted compound on acid production and growth of the mixture of oral microorganisms expectorated from the oral cavity along with saliva, sucrose, and other solubles derived from chewing gum. The organisms employed for these studies were the normal inhabitants of the oral cavity, derived from the oral mucosa, tongue, teeth, and some plaque-associated organisms which were dislodged from the tooth surfaces. Samples were collected by expectoration from the oral cavity during chewing of formulated gum, and during chewing of a flavorless, sugarless, paraffin-plasticized gum.

The Brabender special mixer for chewing gum studies was also employed as a mechanical means of extracting solubles from large quantities (150 to 175 grams charge) of gum by sterile human saliva. Aliquots of the mechanically prepared, aseptic extracts were assayed for their anti-microbial effect against a mixed oral microbial population.

The anti-microbial properties of 1-aminoethylphosphonic acid and glyceraldehyde-3-phosphoric acid and the acid inhibiting properties, when mixed in chewing gum compositions are illustrated in Table II. The data obtained from these tests illustrate that 1-aminoethylphosphonic acid at the 1.0 weight percent level in gum, for example, is effective to the extent that acid production is inhibited by between 25 and 74 percent and growth of oral microorganisms is reduced by more than 90 percent over the 24 hours of the incubation time period.

Assays were carried out employing 50 percent of the chewing gum-saliva expectorant and 50 percent basal medium. The glucose-sucrose mixture obtained from the gum during chewing was the only carbon and energy source available to the oral microorganisms during these studies. The carbohydrate concentration in the assay flasks after ½ dilution of the gum extract averaged 8 percent for a 2½ minute chewing time. The extent of inhibition is reported at the end of the assay, 24 hours.

Specific illustrative examples of the preferred phosphorus containing compounds of this invention used as anti-caries agents in chewing gum compositions are set forth hereinafter to illustrate the concentrations which can be employed with facility to achieve and assure significant activity levels of at least 90 percent reduction of acid production and microorganism growth.

It will be noted from the following examples that the invention is not necessarily restricted to a particular chewing gum base but rather can be widely applied to chewing gum bases with which the art is well acquainted.

The gum base hereinafter referred to covers the nonnutritive, masticatory substance in chewing gum, as defined in the Federal Food, Drug and Cosmetic Act. In the regulation covering chewing gum ingredients under the Food Additives Amendment (Federal Register, p. 4419, May 9, 1962), paragraph (a) sets forth the ingredients permitted in chewing gum base under the regulation, and paragraph (c) defines the term "chewing gum base" as meaning "the manufactured or partially manufactured non-nutritive masticatory substance comprised of one or more of the ingredients named and so defined in paragraph (a) of this section." Suitable representative chewing gum bases which can be employed with facility in formulating the chewing gum compositions of the invention are those disclosed, for example, in U.S. 2,284,804 of F. T. De Angelis and U.S. 2,137,746 of R. L. Wilson.

The flavoring agents which can be used are any of the usual flavoring agents well known in the art. Spearmint, Doublemint and Juicy Fruit flavor agents are preferred in the first example, and P.K. is utilized to designate the coated gums manufactured according to the second example. Whenever and wherever the terms "Spearmint," "Doublemint," "Juicy Fruit," or "P.K." are used throughout this specification, they refer to products which are sold under the registered trademarks Wrigley's Spearmint chewing gum, Wrigley's Doublemint chewing gum, Wrigley's Juicy Fruit chewing gum, and Wrigley's P.K. pellet chewing gum which are proprietary marks of the Wm. Wrigley, Jr. Company, Chicago, Ill.

Where hereinafter designated, the preferred embodiments also include an abhesive such as a water-soluble hydrolyzable tannin, a water-containing hydrophilic gel, and a plasticizer. A representative abhesive which can be employed with facility in the preparation of the chewing gum compositions of the inventions will generally contain glycerine, gelatin, and tannic acid. A variety of abhesives for chewing gum are disclosed in U.S. Pat. No. 3,255,018, patented June 7, 1966, to Arthur J. Comollo.

Abhesives are used to counteract the tendency of chewing gum compositions to adhere to teeth and particularly to certain types of dentures and artificial teeth. A hydrophilic gel such as gelatin, in the preferred embodiment, when made into a heavy paste with water forms with a water-soluble, hydrolyzable tannin, such as tannic acid, a hydrogen-bonded adduct thereby reducing the water solubility of the tannin and decreasing the rate at which it is extracted from the gum. A plasticizer such as glycerine, is used as a cosolvent which acts with the water to form a gel of higher viscosity than is obtainable with water alone.

The abhesive, in addition to the plasticized gelatin-tannic acid adduct, may also include an amount of free tannic acid. The plasticized gel functions merely to reduce the rate of tannic acid extraction after the gum is hydrated and accordingly the free tannic acid may be preferred to provide initial abhesive action.

It should be noted that U.S. Pat. No. 3,255,018 describes a wide variety of abhesives and methods of incorporating the said abhesives into chewing gum compositions. An abhesive comprising a plasticized gelatin-tannic acid adduct together with free tannic acid is described herein merely as preferred. The chewing gum compositions of this invention may include any desired abhesive and the use of the gelatin-tannic acid adduct and tannic acid is not intended to limit the scope of this invention in any way. Accordingly, the disclosure of U.S. Pat. No. 3,255,018 together with the methods of formulating the said abhesive and including them in chewing gum compositions disclosed therein is hereby incorporated in its entirety.

The following examples illustrate the incorporation of the anti-caries agents of this invention in each of three basic chewing gum formulations. The first example is a general formula and method of making a stick gum with an anti-caries agent. The second example relates to coated gum, and the third relates to bubble gum. It should be noted that the chewing gum formulations are illustrative only, and may be varied as would be obvious to one skilled in the art without departing from the concept of this invention which specifically includes the incorporation of an anti-caries agent in a chewing gum composition.

Broadly speaking the anti-caries agent is added in the same manner as the abhesive and flavoring and may be mixed with these agents prior to their incorporation in the gum or added separately as is illustrated in the following examples:

EXAMPLE I

| Ingredients | Formulations (parts by weight) | | |
|---|---|---|---|
| | (a) | (b) | (c) |
| Gum base | 20.4 | 20.0 | 20.0 |
| Corn syrup | 20.6 | 20.0 | 20.0 |
| Sugar | 55.7 | 53.2 | 51.2 |
| Corn sugar | 1.6 | 1.6 | 1.6 |
| Gelatin-tannic acid adduct | 2.6 | 2.6 | 2.6 |
| Tannic acid | 0.1 | 0.1 | 0.1 |
| Glycerine | 1.6 | 1.6 | 1.6 |
| Flavor | 0.6 | 0.6 | 0.6 |
| Anti-caries agent | 0.1 | 3.0 | 5.0 |

The gum base is softened by working in a warm mixer maintained at a temperature of 122° F. The gelatin-tannic acid adduct is then added and thoroughly mixed with the softened base. All of the corn syrup is then added along with the anti-caries agent followed by two-thirds of the mixture of sugar and corn sugar. When these ingredients are well mixed, the glycerine is added followed by the balance of the sugar, corn sugar mixture. Subsequently the tannic acid is added followed by the flavor which may be Spearmint, Doublemint or Juicy Fruit. As soon as the last ingredients are thoroughly mixed, the batch is discharged, allowed to cool slightly, sheeted and scored in the usual fashion.

Columns (a), (b) and (c) represent the parts by weight of stick chewing gum formulations when the anti-caries agent is 0.1, 3.0, and 5.0 parts by weight of the mixture. The anti-caries agents used in the preferred embodiments of this example were either 1-aminoethylphosphonic acid or glyceraldehyde-3-phosphoric acid. These compounds may be used alone or in a combination in total parts by weight of from 0.1 to 5.0 as desired.

EXAMPLE II

The following example is a master formula for a coated gum such as Wrigley's P.K. pellet chewing gum. The anti-caries agents are those listed in Example I. The anti-caries agent may be added as an ingredient to either the center or the coating or interspersed throughout both in a weight percent of from 0.1 to 5.0 as desired. As in Example I the agent may be either 1-aminoethylphosphonic acid or glyceraldehyde-3-phosphoric acid, or a combination of two or more totaling from 0.1 to 5.0 by weight percent of the total coated gum composition.

Center: Percent by weight
    Glycerine _____ 0.76
    Sugar _____ 50.43
    Corn syrup _____ 20.93
    Corn sugar _____ 1.90
    Flavor _____ 0.76
    Gum base _____ 25.22
Coating:
    Carnauba wax _____ 0.01
    Sugar _____ 92.49
    Gum arabic _____ 5.52
    Dextrin _____ 1.38
    Flavor _____ 0.60

The centers are mixed as described in Example I and may include an abhesive agent as therein described, if desired. If the anti-caries agent is to be added in whole or in part to the center the procedure of Example I is followed.

After the centers are sheeted and cooled they are broken into individual pieces. A weighed quantity of centers is added to each coating pan. A sugar syrup and a gum arabic solution are prepared for the coating operation. The rotation of the coating pan begins and a dipper of the syrup-gum arabic mixture is added to the centers. Warm air is used to dry the mixture on the centers. Flavor is added at appropriate intervals during the coating operation. If the anti-caries agent is to be added to the coating it is added with the flavor. The gum-arabic is eliminated from the coating mixture and only syrup is used during the second coat. Forty coats in all are applied. The finished pieces are polished with carnauba wax.

EXAMPLE III

The following example pertains to the formulations of a bubble gum composition including an anti-caries agent. The anti-caries agent is selected from the list of Example I, specifically 1-aminoethylphosphonic acid and glyceraldehyde-3-phosphoric acid, and may, as in Example I, be incorporated into the chewing gum composition of this example in a weight percent of from 0.1 to 5.0 as desired. The anti-caries agents may be used alone or in a combination totaling 0.1 to 5.0 weight percent of the gum composition.

| Ingredients: | Percent by weight |
|---|---|
| Gum base | 16.8 |
| Corn syrup | 22.4 |
| Sugar | 59.7 |
| Water | 0.3 |
| Glycerine | 0.3 |
| Flavor | 0.5 |

The gum base is softened by working in a warm mixer maintained at a temperature of 122° F. All of the corn syrup is then added along with the anti-caries agent followed by two-thirds of the mixture of sugar and corn sugar. When these ingredients are well mixed, water and glycerine are added followed by the balance of the sugar mixture. Finally, the flavor is incorporated. As soon as all the ingredients have been thoroughly mixed, the batch is discharged, allowed to cool slightly, and formed into individual pieces of desired shapes and sizes, and scored in the usual fashion.

It is believe manifest and apparent from the teachings set forth hereinbefore and the specific examples provided that many different components and materials may be utilized in the invention. Also, new materials including synthetic resins and polymeric materials are constantly being developed and made commercially available, many of which, undoubtedly, will be found useful in the manufacture of the compositions of the inventor. It is, therefore, not only impossible to attempt a comprehensive catalog of useful components at this time and, further, to attempt to comprehend and describe the invention in its broader aspects in terms of the physical and chemical nomenclature of the components used herein might tend to be misleading. It is believe that the invention lies, at least in part, in the physical relation or mechanical correlation of suitable components and their individual composition is important only in the manner that individual properties of elements of any mechanical assemblage are important to their proper combination and coaction.

Therefore, to formulate a set of specifications for compositions of the invention in the light of the present disclosure obviously will call for chemical knowledge and skill without departing from the spirit of the invention. It is believe the office of the chemist, chemical engineer and the like will be similar to that of the mechanical engineer who prescribes, in the construction of a machine, the proper materials and the proper dimension therefor. From his knowledge as a chemist of the materials available he will know or deduce, with confidence, their applicability to the achievement of the objects and purposes of the invention or, otherwise, and in the case of novel materials routine tests not necessarily of an inventive nature will provide reliable data for such determination. In analogy to the case of a machine wherein the use of certain materials of construction or dimensions of parts would lead to no practically useful result, various materials will be rejected as inapplicable while others operative as such and illustrative of the theoretical basis of the invention may not be practically useful because the significant temperatures or ranges of temperatures involved would not be particularly advantageous or find a particular application in the practical arts or because of consideration of the cost of materials, etc. Thus, it is believed that it can be safely assumed that no one skilled in the art would wish to make a useless composition or would be misled because it is possible to misapply the teachings of the present disclosure in order to do so.

What is claimed and desired to be secured by United States Letters Patent is:

1. A chewing gum composition comprising a chewing gum base and an effective amount of at least one member of the group consisting of 1-aminoethylphosphonic acid and glyceraldehyde - 3 - phosphoric acid to give the gum anti-caries activity.

2. The chewing gum of claim 1 containing 1-aminoethylphosphonic acid in a concentration at least 0.1 weight percent of the chewing gum composition.

3. The chewing gum of claim 2 wherein the 1-aminoethylphosphonic acid is present in an amount of approximately 0.1 to 5.0 weight percent of the chewing gum composition.

4. The chewing gum of claim 1 containing glyceraldehyde-3-phosphoric acid in a concentration of at least 0.1 parts by weight of the chewing gum composition.

5. The chewing gum of claim 4 wherein the glyceraldehyde-3-phosphoric acid is present in an amount of approximately 0.1 to 5.0 parts by weight of the chewing gum composition.

No references cited.

RICHARD L. HUFF, Primary Examiner

U.S. Cl. X.R.

424—54, 57

UNITED STATES PATENT OFFICE
CERTIFICATE OF CORRECTION

Patent No. 3,629,395          Dated December 21, 1971

Inventor(s)  JOHN H. LITCHFIELD and VICTOR G. VELY

It is certified that error appears in the above-identified patent and that said Letters Patent are hereby corrected as shown below:

In Col. 2, line 4, "inhibited" should read --inhibit--; in lines 13-14, "applications" should read --application--; in line 23, "or" first occurrence should read --for--.

In Col. 7, line 49, "believe" should read --believed--.

In Col. 8, line 5, "believe" should read --believed--.

Signed and Sealed this second Day of March 1976

[SEAL]

Attest:

RUTH C. MASON
Attesting Officer

C. MARSHALL DANN
Commissioner of Patents and Trademarks